June 29, 1943.  R. W. BALL  2,322,811
BOLT
Filed March 12, 1942
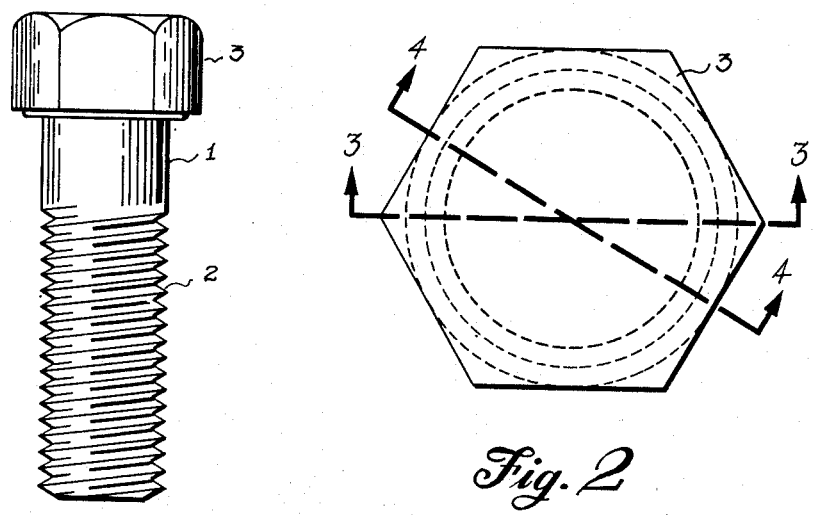
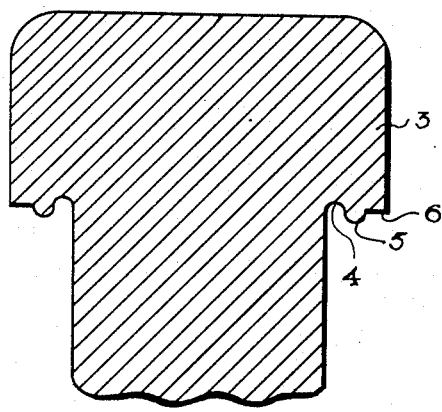
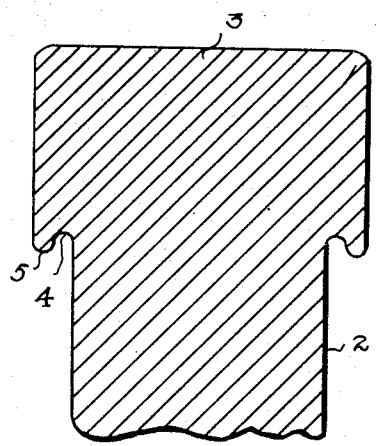
INVENTOR.
Roland W. Ball
BY Patented June 29, 1943

2,322,811

UNITED STATES PATENT OFFICE 2,322,811

BOLT

Roland W. Ball, Garden City, Mich.

Application March 12, 1942, Serial No. 434,367

2 Claims. (Cl. 85—9)

This invention relates to bolts and has for its object to provide a bolt of improved utility, adaptable for all uses of the conventional similar bolt and of materially improved economy of manufacture.

In making bolts composed of a head and a shank threaded at its outer end, a rod or wire is cut to length and one end is upset to form a head by the use of dies. Since the bottom of the head is intended to be flat it meets the shank at a right angle. If the dies wear so that this right angle is not accurate the head does not seat properly so that leakage will occur therepast in the environment of fluid pressures. The necessity for preserving an accurate right angle causes rapid wear on the dies. It is therefore a principal object of the invention to provide an improved shape for the bottom side of the bolt head which will obviate the necessity for maintaining the right angle relation and which will be made by dies having a very materially longer life.

Another object is to provide a bolt head having a bottom side which will not require a right angle relation with its shank but which will form an effective and improved seal for retaining fluid pressures. The bolt is highly adaptable for use in retaining a cylinder head on the block of an engine.

More particularly it is an object of the invention to provide an improved bolt in which the bottom side of the head is formed by a composite curve, one of which obviates the necessity for a right angle relation between the head and the shank and the other of which serves as a sealing ring against the escape of fluid pressure.

The invention is applicable generally to bolts and rivets and likewise to nuts.

Other objects and advantages will become hereinafter more fully apparent as reference is had to the accompanying drawing in which my invention is illustrated and in which Figure 1 is a side elevation of my improved bolt, Figure 2 is a top plan view thereof, Figure 3 is an enlarged fragmental section taken along the line 3—3 of Figure 2, and Figure 4 is a fragmental section taken along the line 4—4 of Figure 2.

More particularly, 1 indicates a bolt body or shank or shaft having a threaded lower end 2 and a head 3 integral with its upper end. If the threads 2 are omitted a rivet results and my invention, which pertains to the head end of the bolt is equally applicable to rivets also.

The bolt as illustrated is conventionally made from wire or small bar stock, cut to length, threaded as at 2 and upset at its other end in a die by which the head is formed. The bolt body conventionally has a right angle relation with the bottom of the head. According to this invention, the bottom of the head 3 has a groove 4 which is semi-circular in any cross-section taken radially of the bolt, the groove 4 encircling the shank 1 in close proximity thereto so that the walls of the shank are tangent to the inner walls of the groove.

A land 5 encompasses the groove 4. This land is also semi-circular in any cross-section taken radially of the bolt. Preferably it has the same radius as the groove 4 and the inside walls thereof merge into the outside walls of the groove thus forming a sine curve. Outwardly of the land 5 the bottom of the head is flattened. Where the head has flat sides as does the conventional hexagonal type illustrated the land 5 may well be tangent to the sides of the hexagon so that the flat portion of the head bottom is composed of the several flat portions 6. The center lines of the groove 4 and land 5 preferably lie in the plane of the flat portion 6.

The groove 4 can be made with materially less die wear than can the conventional right angle relation. The land 5 will form an excellent seal against loss of fluid pressures and will form an improved seat without cutting into the surface against which it presses, as is the case with the outer corners of most of the conventional bolts.

Various changes can be made without departing from the spirit of my invention and I therefore desire to be extended protection within the scope of the appended claims.

What I claim is:

1. A bolt comprising a shank and a head, the bottom of said head comprising a groove encircling said shank immediately adjacent thereto, said groove being arcuate in cross-section, a flattened portion adjacent the periphery of said bottom, and a land curved in cross-section connecting the side walls of said groove and said flattened portion, said flattened portion and the centers of said groove and land all lying in the same plane radially of said shank.

2. A bolt comprising a shank and a head, the bottom of said head comprising a groove encircling said shank immediately adjacent thereto, said groove being arcuate in cross-section with said shank being tangent to the inner wall thereof, a flattened portion adjacent the periphery of said bottom, and a land connecting said groove and said flattened portion, said land being arcuate in cross section with its inner wall merging into the arcuate outer wall of said groove and having a radius equal to that of said groove, the centers of said groove and of said arc lying in the plane of said flattened portion.

ROLAND W. BALL.